Oct. 18, 1955  H. J. STANCHECK ET AL  2,720,719
SIGNAL FLAG FOR ICE FISHING APPARATUS
Filed May 19, 1952  2 Sheets-Sheet 1
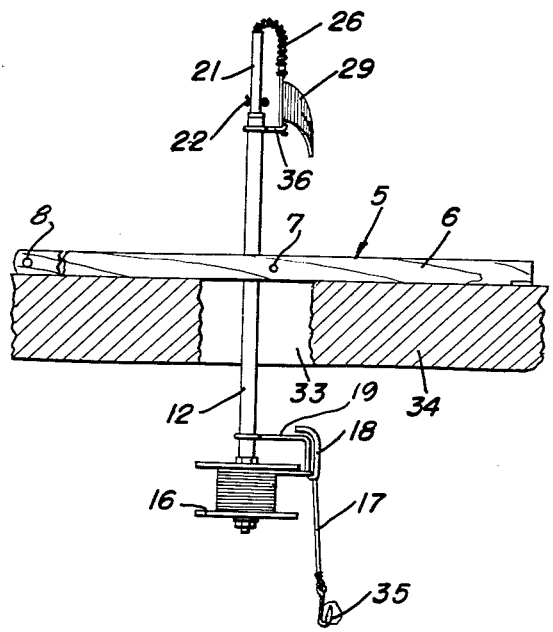
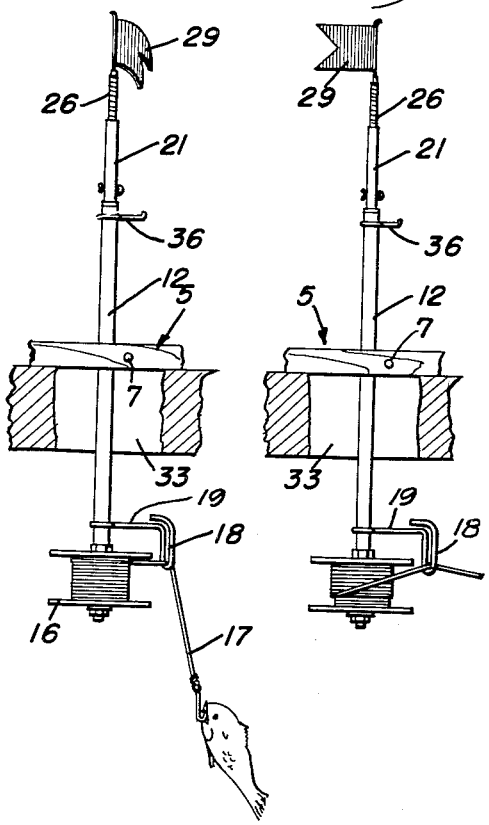
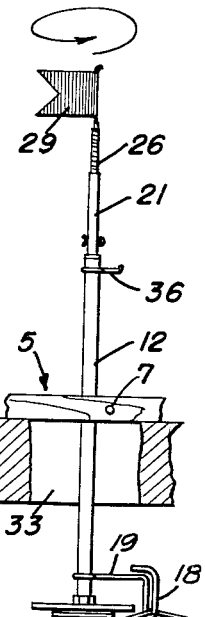
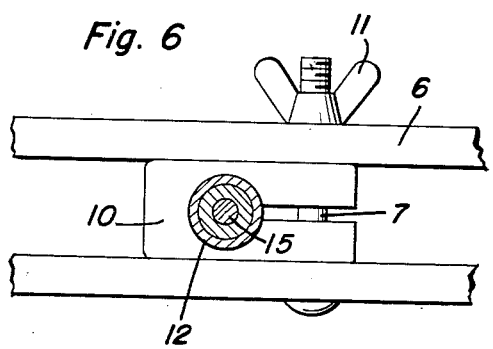
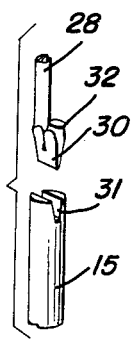
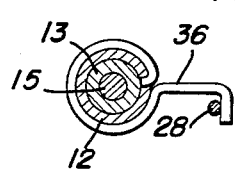
Harry J. Stancheck
Raymond J. Barnoski
INVENTORS
BY *[signatures]*
Attorneys Oct. 18, 1955                H. J. STANCHECK ET AL                2,720,719
                      SIGNAL FLAG FOR ICE FISHING APPARATUS
Filed May 19, 1952                                               2 Sheets-Sheet 2
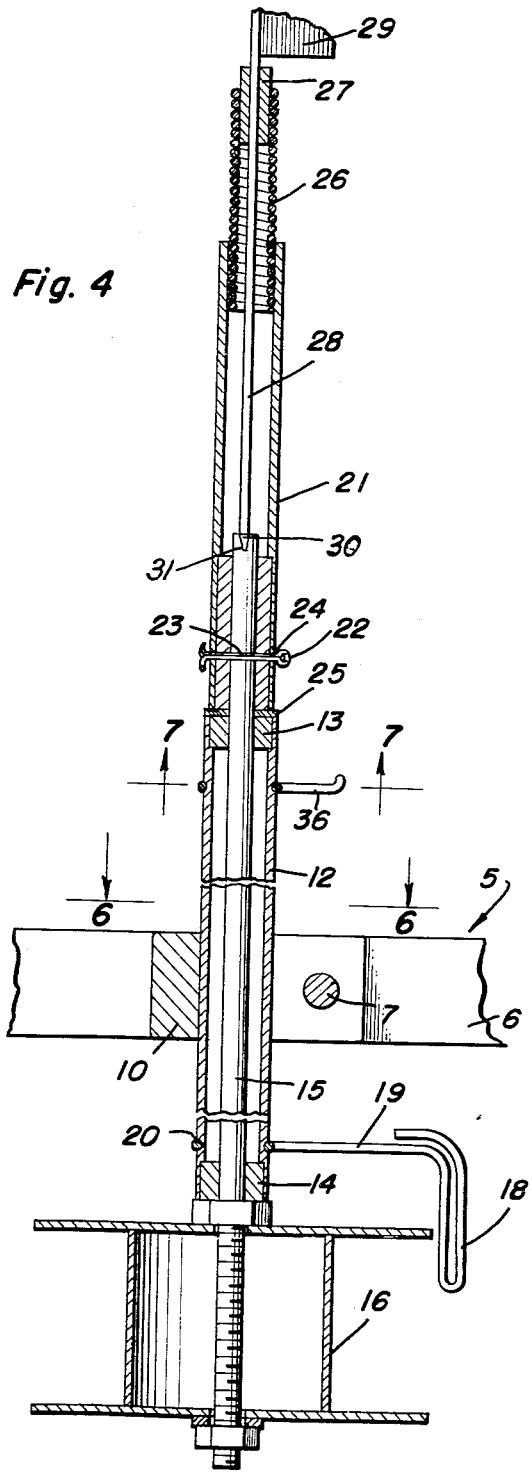
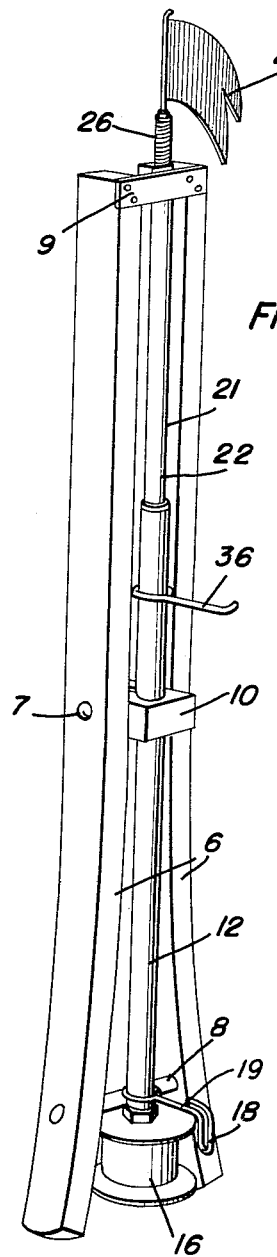
Harry J. Stancheck
Raymond J. Barnoski
INVENTORS.
BY *(signatures)*
Attorneys

United States Patent Office 2,720,719
Patented Oct. 18, 1955

2,720,719

SIGNAL FLAG FOR ICE FISHING APPARATUS

Harry J. Stancheck and Raymond J. Barnoski, Milwaukee, Wis.

Application May 19, 1952, Serial No. 288,618

4 Claims. (Cl. 43—17)

The present invention relates to new and useful improvements in fishing apparatus for use in fishing through ice and more particularly to a signal flag to indicate the catching of a fish.

An important object of the invention is to provide a rotatable staff for the flag actuated by the paying out of a line on a reel connected to the flag staff.

Another object is to provide a novel setting and releasing means for the flag to hold the flag in an inverted position when set and to release the flag upon an initial unwinding motion of the reel, and including spring means for swinging the flag upright, and further to provide means for automatically connecting the flag staff in driving engagement with the reel to rotate the flag about the axis of its staff upon a continuing unwinding of the reel.

A still further object is to provide an apparatus of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the flag set;

Figure 2 is a similar view showing the flag released;

Figure 3 is a similar view showing the flag being rotated;

Figure 4 is an enlarged vertical sectional view showing the flag staff connected to the reel for rotation thereby;

Figure 5 is an enlarged perspective view of the automatic driving connection between the flag staff and the shaft of the reel;

Figures 6 and 7 are transverse sectional views taken respectively on the lines 6—6 and 7—7 of Figure 4; and, Figure 8 is a perspective view showing the standard with the flag thereon folded on its support.

Referring now to the drawings in detail, wherein for the purpose of illustration we have disclosed a preferred embodiment of our invention, the numeral 5 designates a support composed of a pair of bars 6 secured to each other in spaced parallel relation by a central cross pin 7, an end cross pin 8, and an end cross plate 9. A split clamping block 10 is mounted on center cross pin 7 between the bars and on which a wing nut 11 is threaded to tighten the clamp about a tubular standard 12 and to hold the clamp from pivoting on the pin.

Standard 12 is closed at its ends by upper and lower bushings 13 and 14 and in which a shaft 15 is journaled and lubricated by grease (not shown) contained in the standard. A reel 16 is secured to the lower end of the shaft for winding and unwinding a fishing line 17 thereon and which passes through a guide 18 supported outwardly at the periphery of the reel by an arm 19 rotatably held in a groove 20 in the lower portion of the standard for swinging movement about the latter independently of the reel.

The upper end of shaft 15 is secured in the lower portion of a tubular member 21 by means of a transverse cotter pin 22 passing through alined openings 23 and 24 in the shaft and member respectively, and the lower end of tubular member 21 rotatably rests on a washer 25 on top of standard 12.

A coil spring 26 has its lower end frictionally held in the upper end of tubular member 21 and projects upwardly therefrom and a sleeve 27 is frictionally held in the upper outer end of the spring and in which a flag staff 28 is slidably mounted. A flag 29 is secured to the upper end of flag staff 28.

The lower end of flag staff 28 is formed with a wedge-shaped connector 30 thereon adapted to enter a V-shaped notch 31 formed in the upper end of shaft 15 to rotatably connect the flag staff to the shaft.

A stop 32 is also formed at the lower end of the flag staff 28 to engage sleeve 27 and limit outward sliding movement of the flag staff in spring 26.

In the operation of the device, the support 5 is placed in bridging position over a hole 33 in ice 34 and with the standard 12 extending downwardly through the hole. The line 17 on reel 16 is paid out to lower baited hook 35 in the water to a desired depth and flag staff 28 is pulled upwardly through sleeve 27 to disengage the flag staff from shaft 15, the stop 32 striking the sleeve to prevent complete removal of the flag staff. Spring 26 may then be bent downwardly to invert the position of the flag which is held set by engaging the inverted flag staff with a hook or catch 36, which is supported in a fixed laterally projecting position on standard 12, as shown in Figure 1.

When a fish is hooked and pulls on line 17, the shaft 15 and tubular member 21 will be turned, and the frictional connection of spring 26 with the member 21 will likewise cause the spring and flag staff 28 to swing about the axis of the standard to release the flag staff from catch 36 and the flag will swing upwardly into its perpendicular position, as shown in Figure 2.

The flag staff will then slide downward in sleeve 27 to engage connector 30 in the notch 31 of shaft 15 and the continued pulling action of the fish will rotate the reel 16 and the flag to attract attention thereto.

Guide 18 maintains the pulling force subjected to the reel at right angles to the axis thereof to insure rotation of the reel as the line is payed out.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing apparatus comprising a combination of a vertical shaft having a reel for a fishing line mounted at its lower end and actuated through the medium of a fish pulling on the line to rotate the shaft, a flag staff, and means carried at the upper end of the shaft slidably supporting the flag staff for detachable coupling engagement of the latter with the shaft for rotation therewith, said means including a coil spring, a rigid tubular member connected to and extending upwardly from the upper end of the shaft and in the upper end of which the coil spring is secured in an upwardly projecting position, said staff extending vertically through the tubular member and through the coil spring and said coil spring being adapted for stretching and flexing into a position to invert the flag when the staff is raised into an uncoupled outwardly projected position relative to said shaft in the rigid member, and means for locking the staff in its inverted uncoupled position, said spring being adapted to retract the staff for coupling with the shaft upon release of the staff from the locking means.

2. A fishing apparatus comprising the combination of a vertical shaft having a reel for a fish line mounted at its lower end and actuated through the medium of a fish pulling on the line to rotate the shaft, a flag staff, means carried at the upper end of the shaft slidably supporting the flag staff and including a resilient member normally supporting the flag staff in a perpendicular position with reference to the surface on which the device is supported and adapted to be flexed into a position to invert the flag staff, said staff being adapted to gravitate into an aligned position with the upper end of the shaft upon a return of the staff to a perpendicular position, and automatic coupling means at the adjacent ends of the shaft and staff rotatably connecting the same to each other when they are in the aligned position.

3. A fishing apparatus comprising the combination of a vertical shaft having a reel for a fish line mounted at its lower end and actuated through the medium of a fish pulling on the line to rotate the shaft, a flag staff, means carried at the upper end of the shaft slidably supporting the flag staff and including a coil spring normally supporting the flag staff in a perpendicular position with reference to the surface on which the device is supported, a rigid member connected to the shaft for rotation therewith and supporting the coil spring above the shaft, said coil spring being adapted to be flexed into a position to invert the flag staff, said staff being adapted to gravitate into an aligned position with the upper end of the shaft upon a return of the staff to a perpendicular position, and automatic coupling means at the adjacent ends of the shaft and staff rotatably connecting the same to each other when they are in the aligned position.

4. A fishing apparatus comprising a support adapted for bridging a hole in ice, a standard on the support and extending upwardly and downwardly therefrom, a vertical shaft journaled in the standard, a tubular member fixed to the shaft for rotation therewith and projecting above the shaft, a reel secured to the lower end of the shaft for rotating the shaft upon paying out a line on the reel, a signal flag including a staff positioned in the tubular member and detachably connected to the shaft, resilient means at the upper end of the tubular member normally supporting the flag staff in a perpendicular position relative to the support and slidably supporting the flag staff for movement of the latter vertically into and out of the tubular member to invert the flag, and catch means carried by the standard and releasably holding the flag in an inverted position, said flag being released by an initial predetermined turning movement of the reel to permit said flag staff to drop by gravity into driven engagement with the shaft to rotate the flag upon the return of the flag staff into an upstanding position.

References Cited in the file of this patent

UNITED STATES PATENTS

| | | |
|---|---|---|
| 787,350 | Alford | Apr. 18, 1905 |
| 2,198,286 | Krivutza | Apr. 23, 1940 |
| 2,451,693 | Richards | Oct. 19, 1948 |
| 2,481,593 | Hoe | Sept. 13, 1949 |
| 2,608,783 | Rogers | Sept. 2, 1952 |
| 2,654,176 | Kachelski et al. | Oct. 6, 1953 |